United States Patent
Paini et al.

(10) Patent No.: US 12,190,143 B2
(45) Date of Patent: Jan. 7, 2025

(54) DYNAMIC MODIFICATION OF ROBOTIC PROCESS AUTOMATION CONTROL PARAMETERS USING BLOCKCHAIN TECHNOLOGY FOR CORRECTING WORKFLOW FAILURE

(71) Applicant: Bank of America Corporation, Charlotte, NC (US)

(72) Inventors: Siva Paini, Telangana (IN); Sakshi Bakshi, New Delhi (IN); Srinivasa Dhanwada, Telangana (IN); Sudhakar Balu, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 556 days.

(21) Appl. No.: 17/474,131

(22) Filed: Sep. 14, 2021

(65) Prior Publication Data

US 2023/0083385 A1 Mar. 16, 2023

(51) Int. Cl.
*G06F 9/46* (2006.01)
*G06F 16/27* (2019.01)
*H04L 9/00* (2022.01)
*H04L 9/08* (2006.01)
*H04L 9/32* (2006.01)

(52) U.S. Cl.
CPC .............. *G06F 9/465* (2013.01); *G06F 16/27* (2019.01); *H04L 9/0861* (2013.01); *H04L 9/0894* (2013.01); *H04L 9/3236* (2013.01); *H04L 9/50* (2022.05)

(58) Field of Classification Search
CPC ....... G06F 9/465; G06F 16/27; H04L 9/0861; H04L 9/0894; H04L 9/3236; H04L 9/50

USPC ......................................................... 718/100
See application file for complete search history.

(56) References Cited

U.S. PATENT DOCUMENTS

| | | | |
|---|---|---|---|
| 7,876,427 B1* | 1/2011 | Melvin ................ | G01M 11/064 356/121 |
| 8,169,916 B1* | 5/2012 | Pai ...................... | H04N 21/2181 709/200 |
| 10,289,456 B2 | 5/2019 | Erickson et al. | |
| 10,372,508 B2 | 8/2019 | Hosabettu et al. | |

(Continued)

OTHER PUBLICATIONS

Chakraborti et al. "From Robotic Process Automation to Intelligent Process Automation", 2020 (Year: 2020).*

*Primary Examiner* — Meng Ai T An
*Assistant Examiner* — Zujia Xu
(74) *Attorney, Agent, or Firm* — Weiss & Arons LLP (57) ABSTRACT

Systems, methods, and apparatus are provided for modification of RPA controls during a workflow without impacting bot performance. A background scan initiated in parallel to an RPA application workflow may identify values for an application control parameter and a corresponding bot control parameter. Hashes of the values may be validated against a key value pair stored as a block in a distributed ledger. If changes have been made to the application control values, the bot control value will not match the application control value and validation will fail. If validation fails, an override may be generated for the bot value. An updated bot value may be stored in a temporary cache until the workflow is complete. Following completion of the workflow, a new block may be added to the blockchain storing a new key value pair including the application control value and the updated bot control value.

13 Claims, 7 Drawing Sheets

(56) References Cited

U.S. PATENT DOCUMENTS

| | | | |
|---|---|---|---|
| 10,616,280 B2 | 4/2020 | Purushothaman | |
| 10,659,482 B2 | 5/2020 | Shannon et al. | |
| 10,671,515 B1* | 6/2020 | Sanghvi | G06F 11/3688 |
| 10,705,948 B2 | 7/2020 | Ramasamy et al. | |
| 10,710,239 B2 | 7/2020 | Safary et al. | |
| 10,812,272 B1* | 10/2020 | Copeland | G06F 21/554 |
| 10,817,314 B1* | 10/2020 | Ganesan | G06F 8/38 |
| 10,956,075 B2* | 3/2021 | Kursun | H04L 63/20 |
| 10,963,231 B1 | 3/2021 | Singh | |
| 10,970,064 B1 | 4/2021 | Anand et al. | |
| 11,544,782 B2* | 1/2023 | Cella | G06Q 40/03 |
| 2008/0310431 A1* | 12/2008 | Nezamzadeh | G07F 19/20 370/252 |
| 2019/0243572 A1* | 8/2019 | Kursun | H04L 9/50 |
| 2019/0392530 A1* | 12/2019 | Kursun | H04L 9/50 |
| 2020/0065685 A1 | 2/2020 | Chenny et al. | |
| 2022/0019195 A1* | 1/2022 | Yu | H04L 51/02 |
| 2022/0092438 A1* | 3/2022 | Casey | G06V 10/764 |
| 2022/0215005 A1* | 7/2022 | Bidkar | H04L 63/0263 |

\* cited by examiner

DYNAMIC MODIFICATION OF ROBOTIC PROCESS AUTOMATION CONTROL PARAMETERS USING BLOCKCHAIN TECHNOLOGY FOR CORRECTING WORKFLOW FAILURE

FIELD OF TECHNOLOGY

Aspects of the disclosure relate to robotic process automation (RPA) workflows.

BACKGROUND OF THE DISCLOSURE

RPA involves the use of computer software-based robots (bots) to perform, rule-based, digital tasks.

RPA may streamline complex tasks through bot interaction with software applications or websites. Illustrative RPA workflows include tasks such as moving data from one application to another, entering data into multiple fields, copying and pasting, and responding to call center inquiries.

A bot may interact with the application based on application metadata. The bot may be programmed to identify application controls and recognize application property values. For example, for a bot configured to populate forms, property values may include identifiers such as name, text, or class.

In some instances, bot failure may be due to a mismatch of controls between the bot and the application. For example, a bot may be configured for the property value "manager." If the application is retooled to use the term "senior manager," the bot may not recognize the field and the workflow may fail.

Conventionally, correcting a bot workflow failure requires time-consuming evaluation of the log files for the entire workflow to check for any control changes. After identifying a mismatch, recoding is required to adapt the bot configuration file to the updated application.

It would be desirable for an inline system to identify changes to application controls and update the bot configuration file. It would be desirable for the system to run in the background without impacting either the application workflow or bot performance.

SUMMARY OF THE DISCLOSURE

Systems, methods, and apparatus for dynamic modification of RPA controls using blockchain are provided.

A scan may be initiated in parallel to an RPA application workflow. The scan may identify a value for an application parameter and a corresponding bot parameter.

The values for the application parameter and bot parameter may be hashed and validated against an encrypted key value pair stored as a first block in a distributed ledger.

In response to a validation failure, the first block may be flagged. An override may be generated for the bot parameter value in the bot configuration file. An updated bot parameter value may be stored in temporary cache for the duration of the workflow.

Following completion of the workflow, a new block may be posted to the distributed ledger. The new block may store a second encrypted key value pair including the application parameter value and the updated bot parameter value.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Systems, methods, and apparatus for dynamic modification of RPA controls using blockchain are provided.

For the sake of illustration, the invention may be described as being performed by a "system." The system may include one or more features of apparatus and methods that are described herein and/or any other suitable device or approach.

RPA may require programming a bot to interact with an application. Metadata for the application may include controls and associated property values. Controls may include attributes of the computing system such as buttons, checkboxes, menus, radio buttons, or any suitable controls. Control property values may include field identifiers. A bot configuration file may identify tasks based on controls and property values for the application.

A workflow failure may occur if the application control property values are changed and no longer match the ones programmed into the bot configuration file.

The system may include a utility capable of checking the application controls, interpreting changes in the application controls, and updating the bot configuration file during runtime. The utility may be applied on an existing or developing RPA solution to update the controls dynamically.

The utility may use Python™ scripts or any suitable program format in any suitable programming language. Python is a registered trademark of the Python Software Foundation. Python is an interpreted, object-oriented, high-level general-purpose programming language.

The utility may generate blocks that capture the structure of workflow components. A blockchain is a distributed ledger of records which contain information. Records stored in a blockchain are organized in blocks. Each block may include multiple records. The blocks are linked to one another and secured using cryptography.

Blockchain storage may capture the relationship between the application controls and the bot configuration files. These relationships may be captured by pairing an application control parameter with the bot version of the control parameter.

The utility may run a scan using parallel threads. A first thread may scan the bot configuration file. The utility may extract control property values for the bot from the bot configuration file. A second thread may scan an application centralized object repository. The utility may extract control property values for the application from the application centralized object repository.

The utility may assign variables to the extracted control property values to establish control parameters. The variables may be used to call the values throughout the session.

The utility may generate a block that stores a key value pair. The key value pair may include a bot parameter paired with the corresponding application parameter along with a hash of the parameter value.

On subsequent runs, the utility may perform continuous scans on the bot and the application. Any change to the application controls may result in a mismatch between the application parameter value and the bot parameter value. The utility may validate the hashed values of the application parameter and the bot parameter against the blocks created on prior runs. If the hash values do not match, validation against the stored key value pair will fail. The utility may flag the block. Flagging the block may serve to identify the bot parameter value that needs to be updated.

The utility may use Python scripts or any suitable programming language to generate a temporary override for the bot configuration file during runtime. A new block with an updated bot parameter value may be created in a temporary pool and may be posted to the blockchain after the session is complete.

Creation of a new block in temporary space improves memory management and synchronization, reducing the load on the system during runtime. The temporary override enables dynamic troubleshooting for any control changes during runtime without impacting bot performance. The evolving blockchain functions as a metadata lineage for the RPA workflow and can be used to track application changes.

The control property capture for both the bot and application components is limited to configuration metadata files, which protects against privacy breaches and ensures data security.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
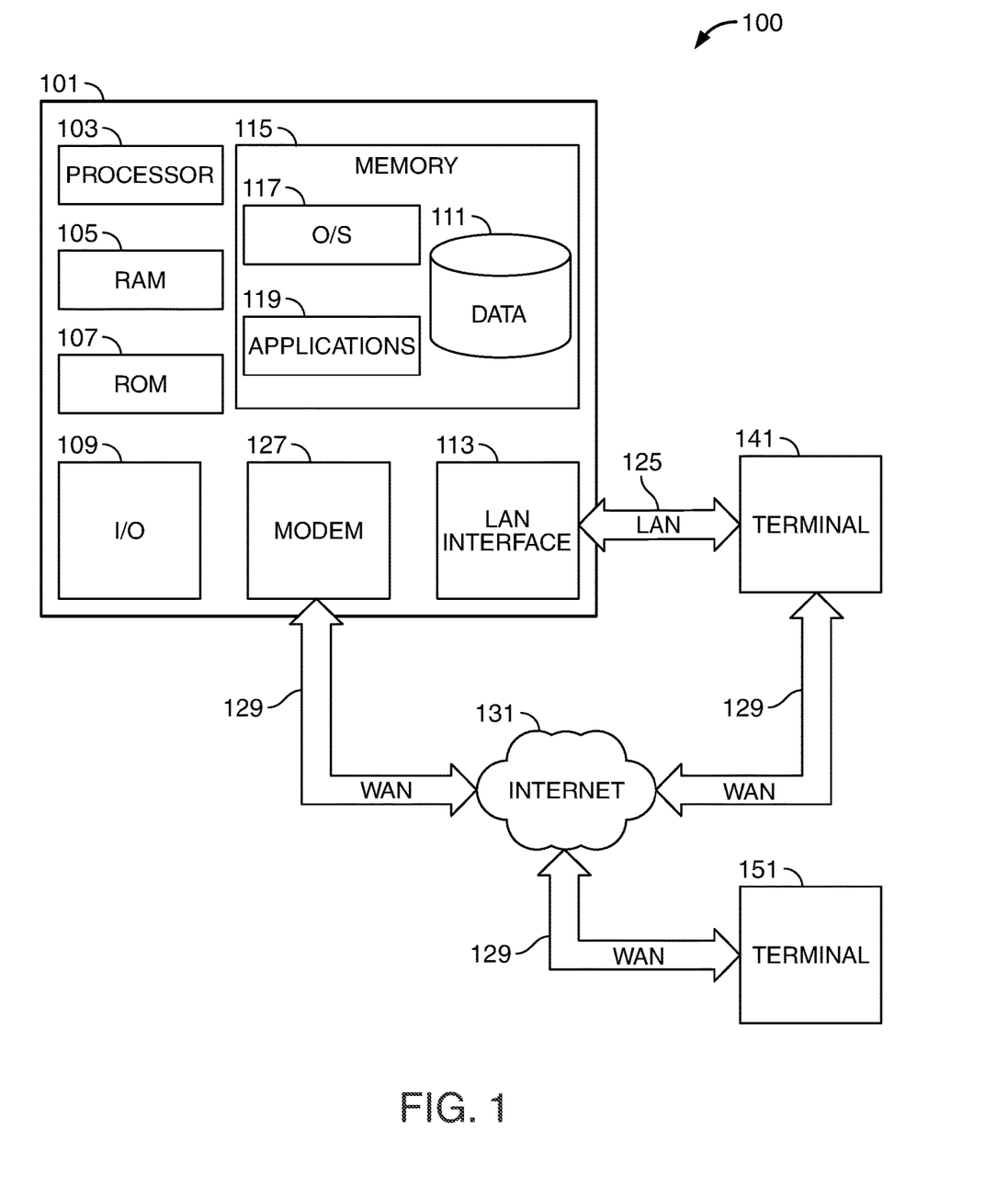
FIG. 1 shows illustrative apparatus in accordance with principles of the disclosure.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and associated database 111.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of scanning a system or a bot, establishing control parameters, encrypting key value pairs, posting blocks to a distributed ledger, validating control values, generating a bot configuration override, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
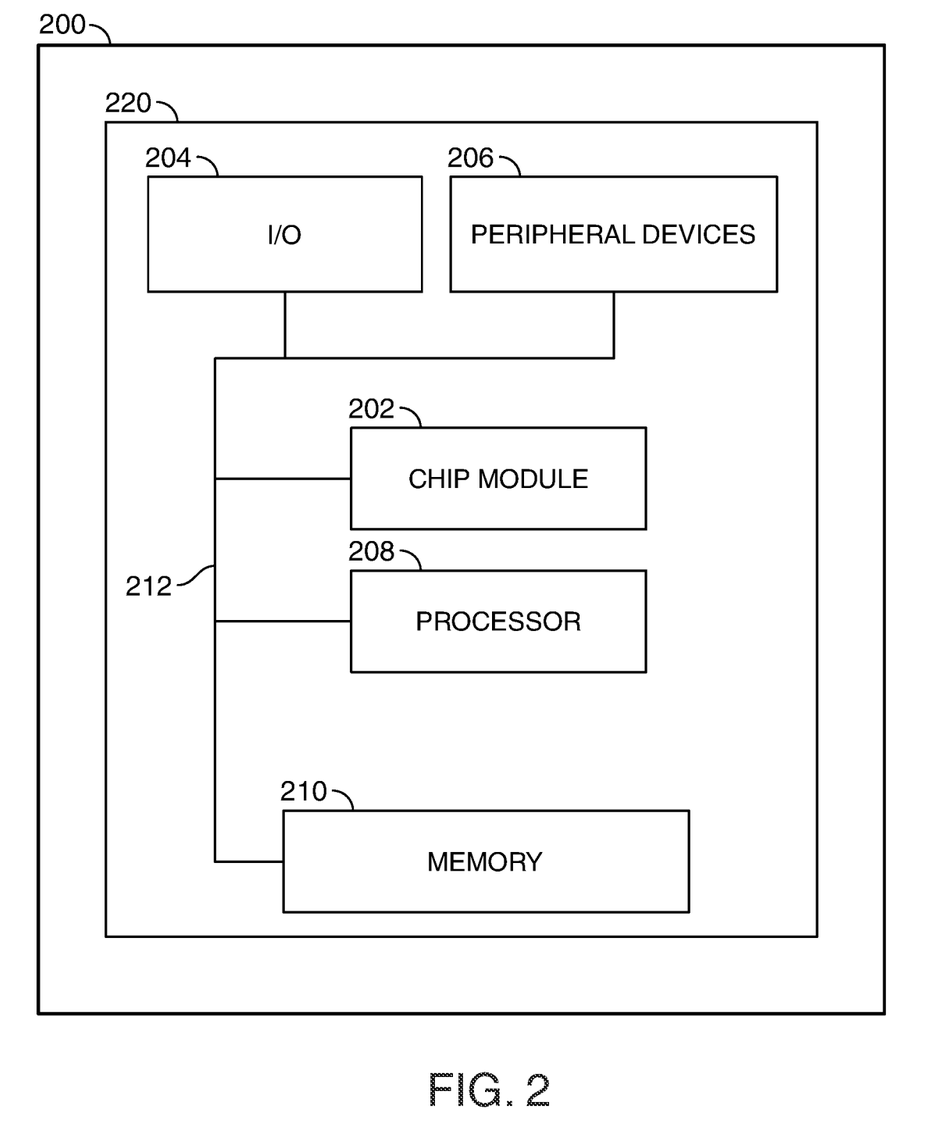
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may perform scans, establish control parameters, encrypt key value pairs, post blocks to a distributed ledger, validate control values, generate a bot configuration override, and perform other methods described herein; and machine-readable memory 210.

Machine-readable memory 210 may be configured to store in machine-readable data structures: bot property values and bot parameters, system property values and system parameters, key value pairs, key value blocks, bot configuration file overrides, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
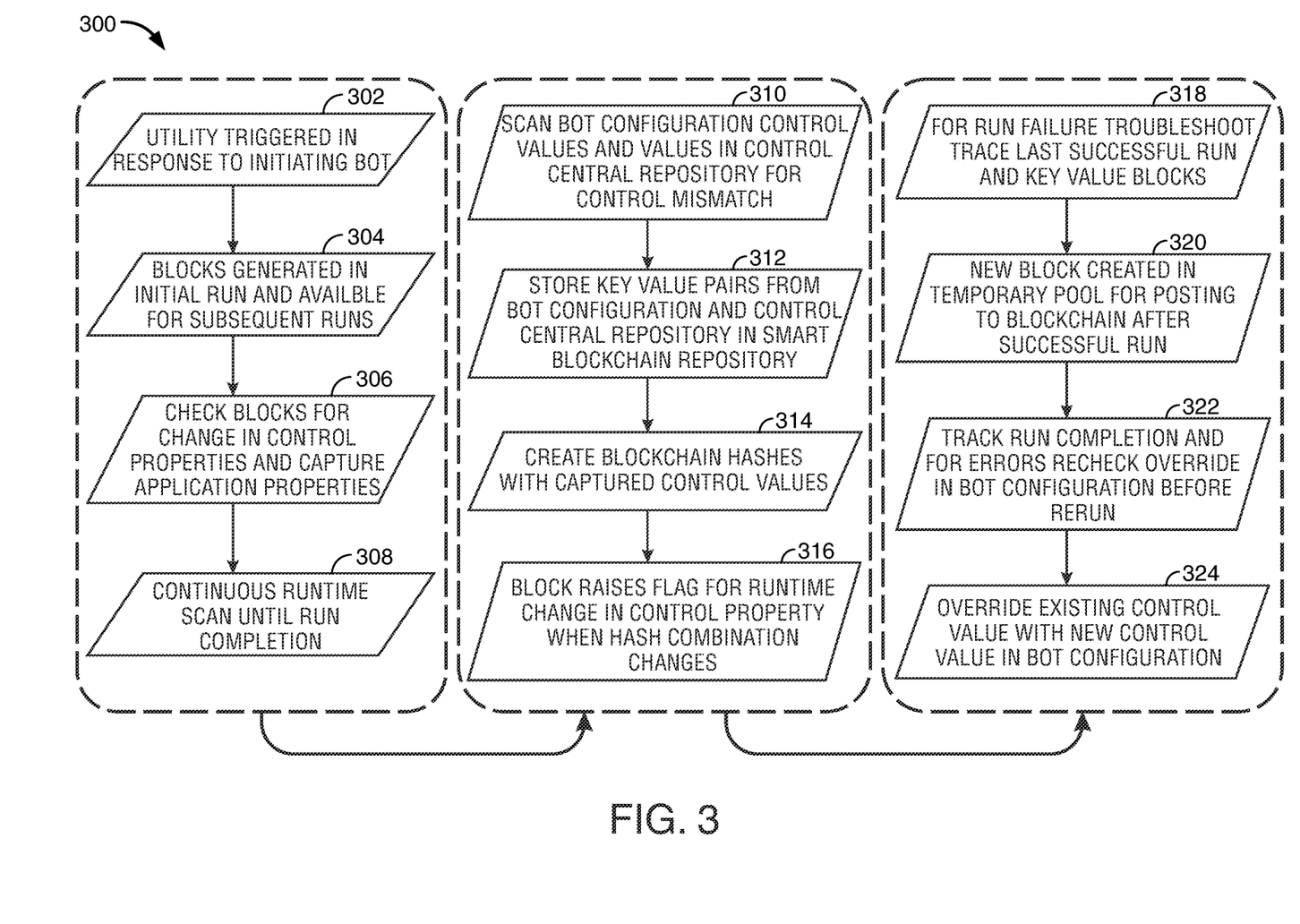
FIG. 3 shows an illustrative process flow in accordance with principles of the disclosure.

FIG. 3 shows process 300 for dynamic changes to RPA controls. Steps 302-308 of process 300 show a utility scan that runs in the background of the application. At step 302, the utility is triggered when the RPA application is initiated. At step 304, the blocks storing encrypted key value pairs are available. At step 306 the scanned properties are checked against the blocks to identify changes to the application control properties. The utility may compare hashes of the scanned control properties to encrypted key value properties stored in the blocks. If no changes are flagged, at step 308, the utility continues to scan the application controls until the runtime is complete.

Steps 310-316 of process 300 show generating key value pairs for blockchain storage. At step 310, the utility scans the bot configuration control values and the application control values from the application central object repository. At step 312, the system stores key value pairs from the bot configuration and the application central object repository in a smart blockchain repository. At step 314, the blocks include hashes for the captured control property values. At step 316, during runtime, a block will be flagged if a control property value changes. The flag may be triggered by a mismatch in the hashes of the key values.

Steps 318-324 of process 300 show dynamic changes in response to a change to an application property value. At step 318, last successful run details and key value blocks can be traced. At step 320, a new block may be created in a temporary pool. The new block may be posted to update the blockchain after the run is completed successfully. At step 322, the utility may track bot completion for errors and confirm the override is reflected. At step 324, the utility may override an existing bot control value with the new control property value.

Figure 4:
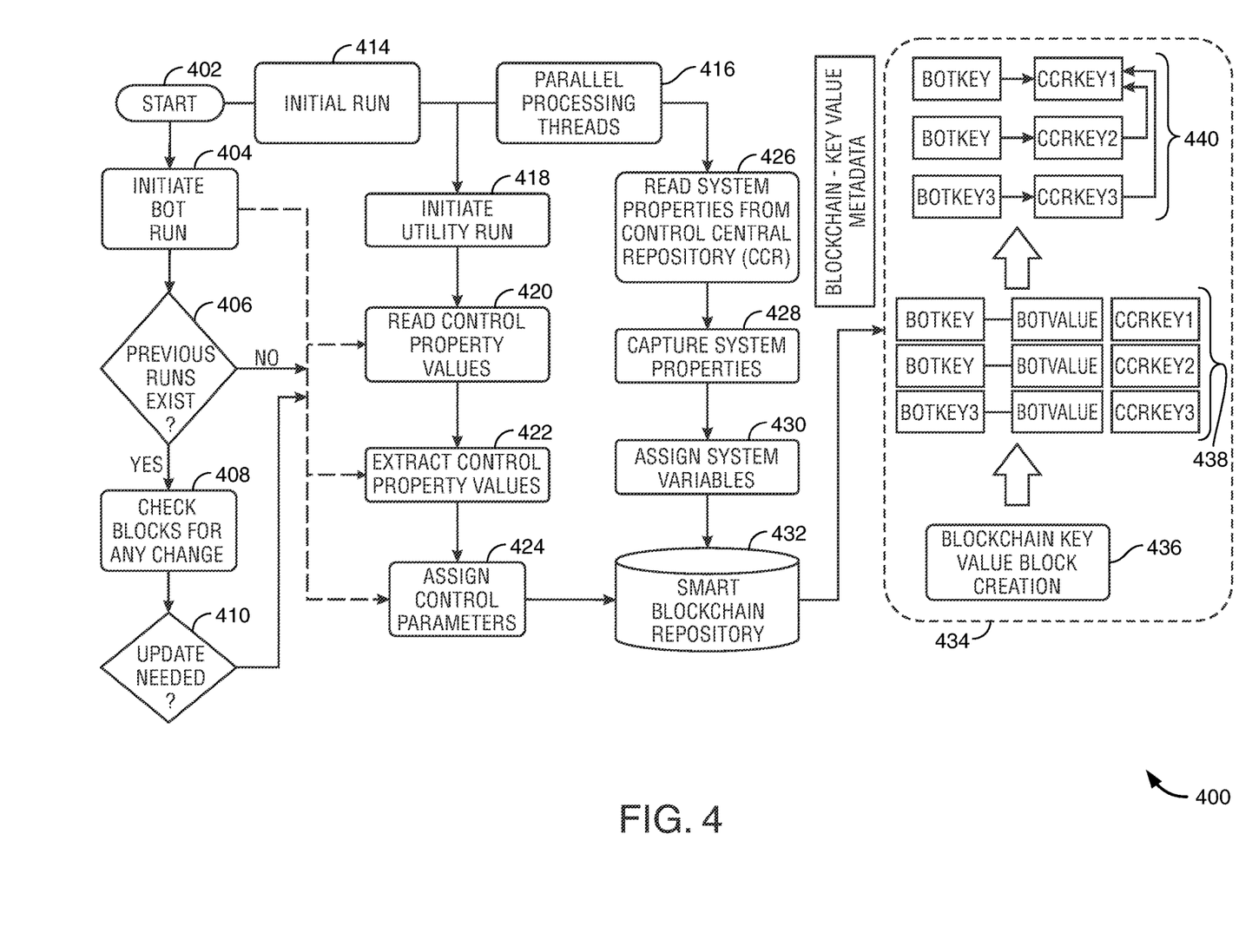
FIG. 4 shows an illustrative process flow in accordance with principles of the disclosure.

FIG. 4 shows process flow 400 for identifying application control changes during runtime. Elements of process 400 may correspond to elements shown in process 300 of FIG. 3.

Steps 404-410 of process 400 show checking scanned property values against blocks established on previous bot runs. If no previous runs exist or if an update is needed, the process continues with steps 414 through 432.

At step 402, the process begins. At step 404, the bot run is initiated. At step 406, the utility determines whether previous runs exist. If previous runs exist, at step 408, the utility checks the blocks from previous runs. If there has been a change in an application parameter value, the bot parameter value will not match the application parameter value and the block will be flagged for an update. At step 410, the utility determines whether any of the blocks have been flagged. If no blocks have been flagged, the scanning process may continue at step 502 of process 500 (shown in FIG. 5).

If no previous runs exist or if an update is needed, process 400 follows the steps for initial run 414. At step 416 parallel processing steps scan both the application and the bot configuration file. At step 418, the scan is initiated. At step 420, the utility reads control property values from the bot configuration file. At step 422, the utility extracts control property values. At step 424, the utility assigns control parameters as pointers associated with the extracted values. At step 432, the bot parameter values are stored in a smart blockchain repository.

While the bot configuration file is being scanned, a parallel process reads system property values from a control central repository (CCR) at step 426. The CCR may be a centralized object repository for the application. At step 428, the system properties are captured. At step 430, system variables (parameters) are assigned as pointers associated with the captured values. At step 432, the application control parameter values are stored in the smart blockchain repository.

Smart blockchain repository 432 may generate encrypted key value blocks and post them to blockchain storage, as shown in box 434. At step 436, the utility creates key value blocks. A key may be a pointer. A bot key may be a bot parameter and an application key may be an application parameter. At step 438, bot and application parameters are paired with each other along with a hash of the associated values. During subsequent scans, the of values associated with the keys should match with each other and can be validated against the block.

Figure 5:
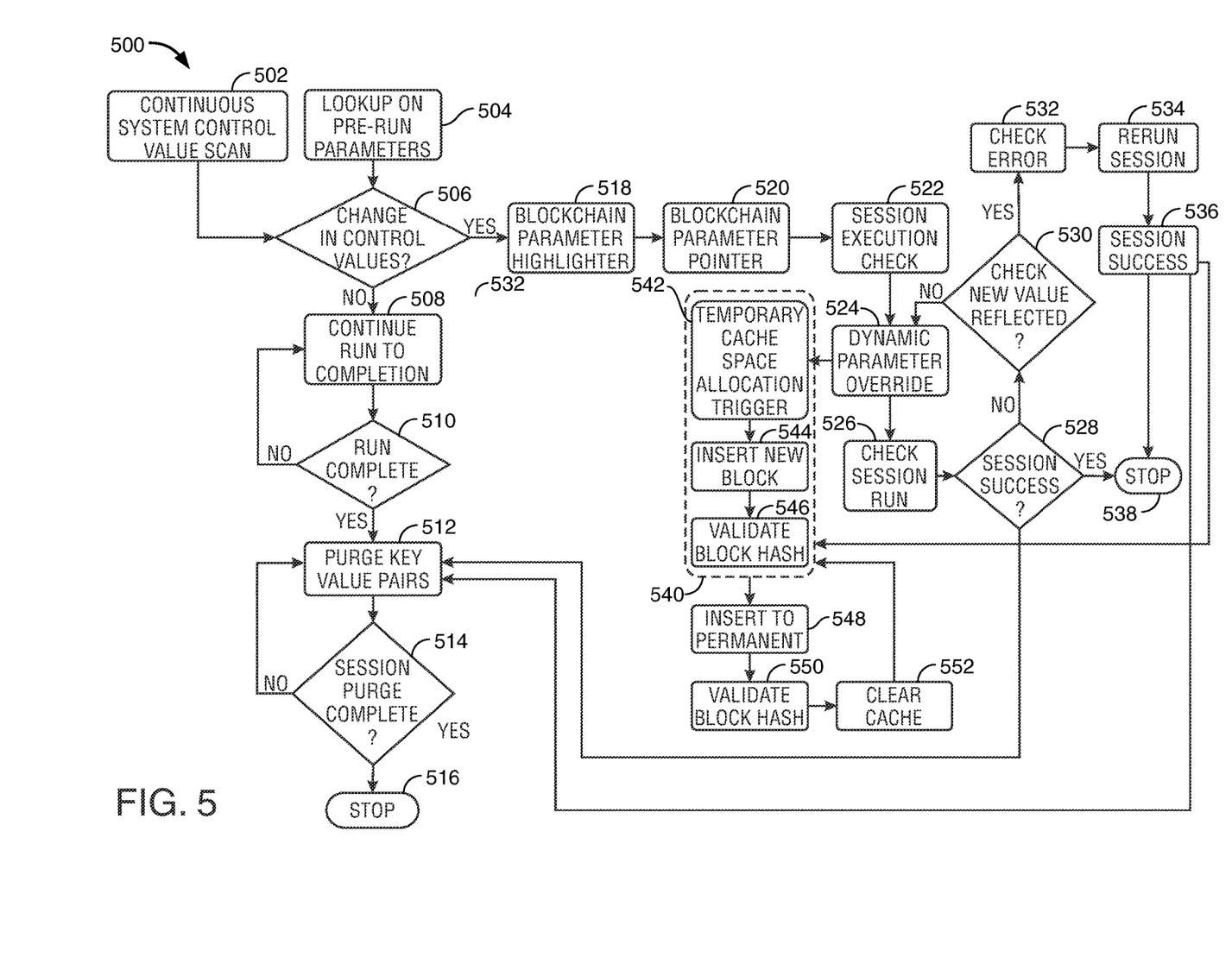
FIG. 5 shows an illustrative process flow in accordance with principles of the disclosure.

FIG. 5 shows process flow 500 for modifying RPA controls during a workflow. Process 500 may include elements shown in process 300 and process 200.

At step 502, the utility scans for application control property values and the corresponding bot control property values. At step 506 the utility may identify parameter values from previous runs that are stored as key value pairs in the blockchain. At step 510, the utility may determine whether there has been any change in control values. A change in the application control value may be identified when a mismatch with the bot control value results in a failure to validate the control values against the key value block.

If there is no change in control values, at step 508, the utility may continue to scan pairs of control values until the workflow is complete. At step 510, the utility may determine whether the run is complete. If the run is not complete, the scan may continue. If the scan is complete, at step 512, the utility may purge the key value pairs that were generated and validated in the course of the scan. At step 514, the utility may determine whether the session purge is complete.

If there is a change in control values, at step 518, the block may be flagged. At step 520, the blockchain parameter pointer may identify the parameter associated with the mismatched values. At step 522, the utility may monitor whether the session has executed as expected. At step 524, the utility may generate a dynamic override for the impacted parameter. The override may include updating a control value in the bot configuration file.

The dynamic parameter override triggers temporary cache activity 540 (shown surrounded by a broken line). At step 542, temporary cache space is allocated. At step 544, a new block is created in temporary space based on the updated bot control value and the application control value. At step 546, the temporary block may be validated. At step 548, after the session has been completed, a permanent block may be posted. At step 550, the permanent block may be validated. At step 552, the temporary cache may be cleared.

Following the dynamic parameter override, the session continues with step 526. At step 526, the utility may check the session run. At step 528, the utility may determine whether the session run has succeeded. If the session run has not succeeded, at step 530, the utility may determine whether the updated control value is reflected in the bot configuration file. At step 532, the determination involves checking the error. At step 534, the session may be run again. At step 536, the session succeeds using the updated bot configuration.

Following session success at step 528 or 536, the key value pairs generated during the scan may be purged at step 512. Also following session success, at step 548, the temporary block generated in box 540 may be added to blockchain. At step 550, the block may be validated to confirm that the encrypted key value pair is correct. At step 552, the temporary cache may be cleared.

Figure 6:
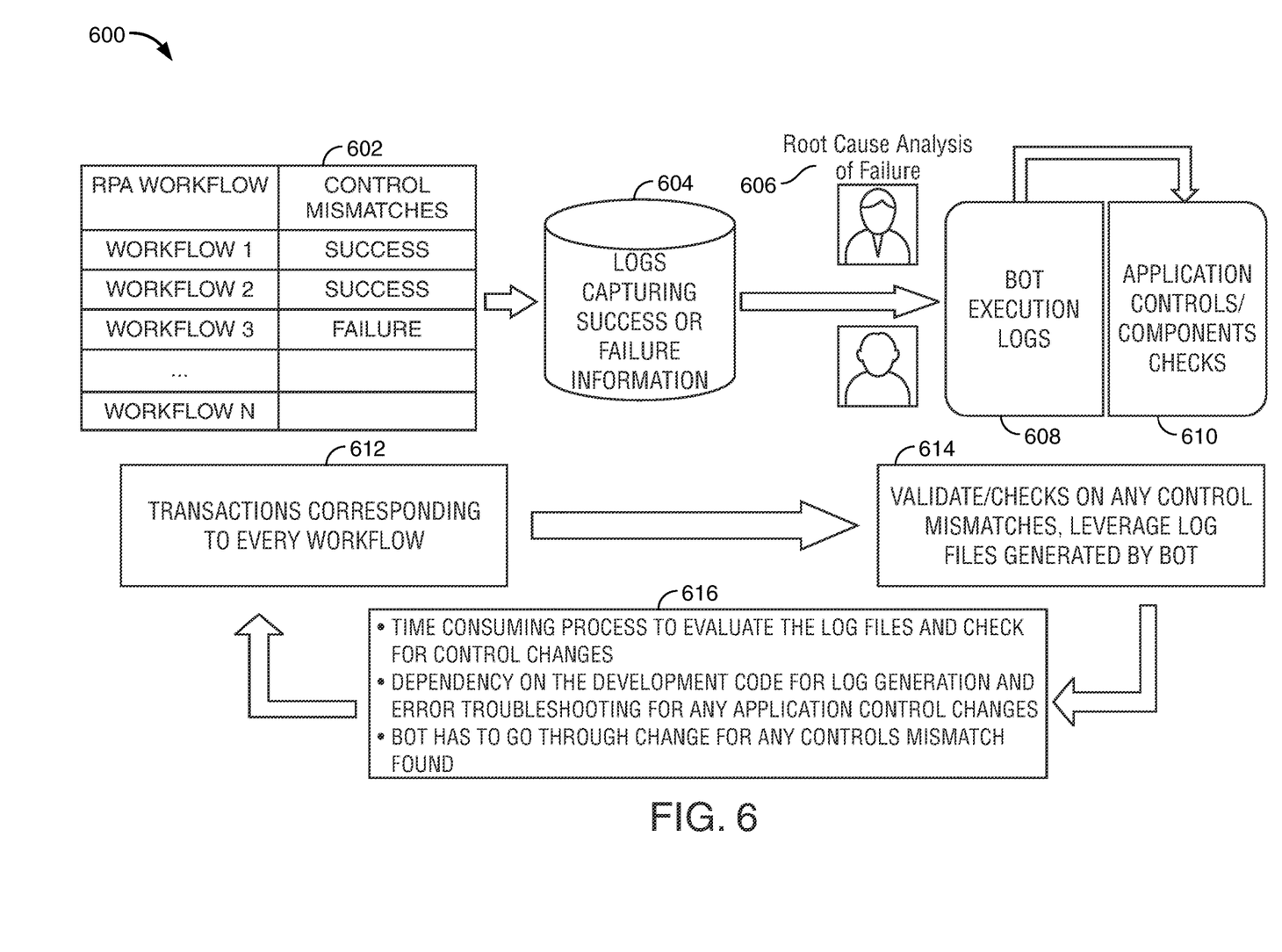
FIG. 6 shows an illustrative process flow in accordance with principles of the disclosure.

FIG. 6 shows process flow 600 illustrating conventional approaches to RPA bot failure. Step 602 shows a workflow failure due to control mismatches between the bot and the application. Step 604 shows logs capturing success or failure information. Step 606 shows analysts tasked with manual root cause analysis after a failure has occurred. At step 608 and 610, manual review of the bot execution logs and manual checks on the application component controls are required. Steps 612-616 highlight weaknesses inherent in troubleshooting based on log analysis and manual re-coding.

Figure 7:
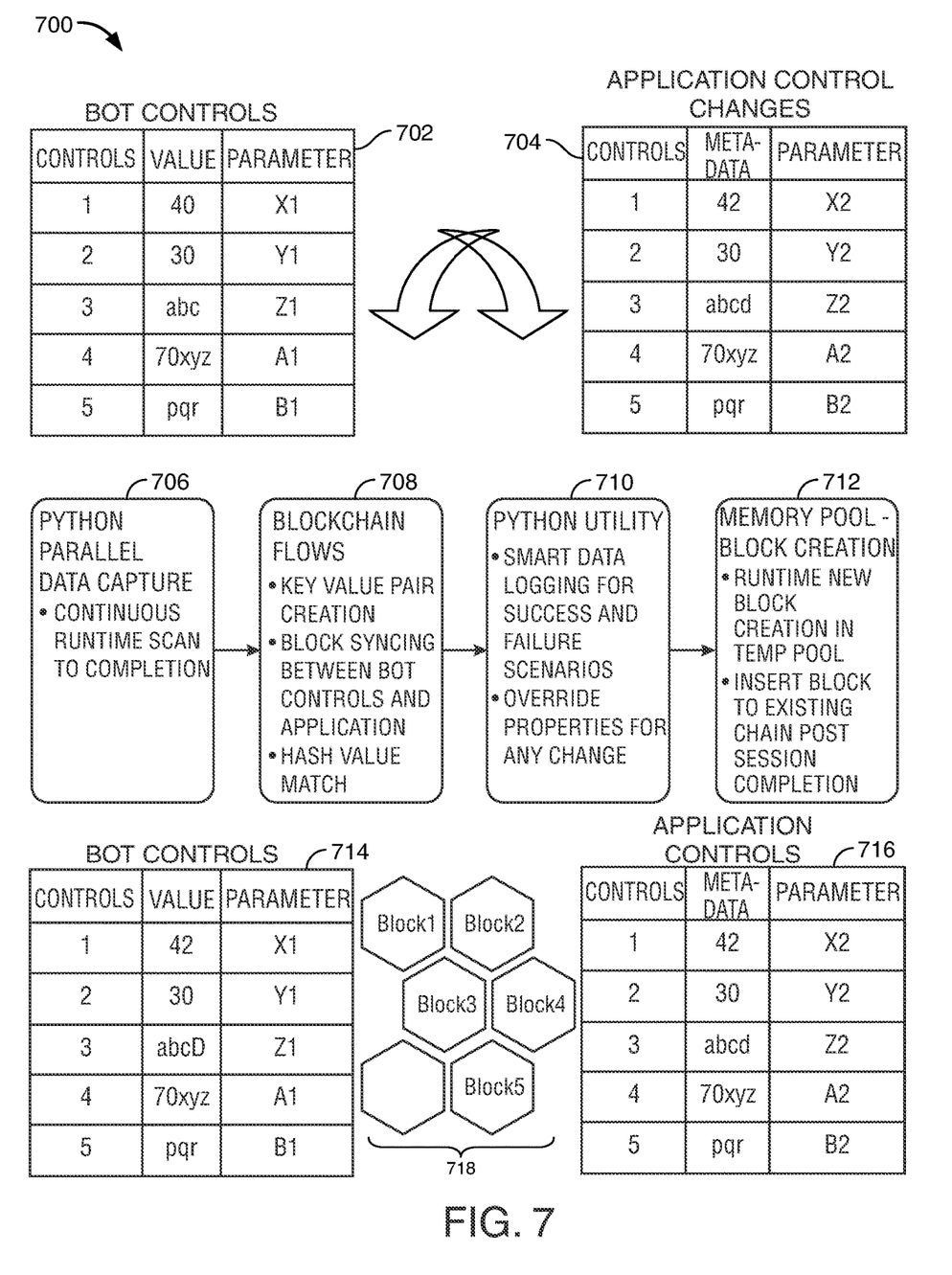
FIG. 7 shows an illustrative process flow in accordance with principles of the disclosure.

FIG. 7 shows process flow 700 illustrating modifications to application controls. Aspects of process 700 may include elements shown in processes 300, 400, and 500.

Bot controls table 702 includes control values for and control parameters for an RPA process. Application controls table 702 includes changes to illustrative controls 1 and 3, so that the values no longer match the bot configuration.

Steps 706-712 show the process for updating the bot configuration file using a Python-based utility. At step 706, Python scripts capture control property values from the bot and the application in the background during every time workflow run. At step 708, a bot control value hash and an application control value hash are matched and validated through the blockchain. At step 710, the Python utility may override bot property values in response to application changes. New blocks may form a log for tracking success and failure scenarios. At step 712, the new block is created during runtime in a temporary cache and is added to the existing blockchain after the session is complete.

Bot controls table 714 includes the updated bot values that now correspond to the changed application controls reproduced in table 716. Blocks 718 include new blocks storing the changed application values and the updated bot values.

Thus, methods and apparatus for DYNAMIC MODIFICATION OF ROBOTIC PROCESS AUTOMATION CONTROLS USING BLOCKCHAIN are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for dynamic modification of robotic process automation (RPA) control parameters using blockchain technology, said method for correcting RPA application workflow failure, the method comprising:

in response to initiation of an RPA application workflow, initiating a background application, the background application running concurrent with the RPA application workflow without causing a decrease in RPA application workflow speed;

at the background application:

at a first parallel processing thread:

continuously scanning RPA application metadata for a duration of RPA application workflow runtime; and extracting an application control property value; and at a second parallel processing thread:

continuously scanning a bot configuration file for the duration of the RPA application workflow runtime; and extracting a bot control property value, the bot control property value corresponding to the application control property value;

autogenerating a key value pair comprising the extracted application control property value and the extracted bot control property value;

accessing a distributed ledger and validating a hash of the key value pair against a first encrypted key value pair stored as a first block in the distributed ledger; and in response to a failure to validate the hashed key value pair against the first block:
  flagging the first block;
  autogenerating an override script for the bot control property value in the bot configuration file, the override script modifying the bot configuration file with an updated bot control property value based on the extracted application control property value;
  overriding the bot control property value with the updated bot control property value for the duration of the RPA application workflow runtime without impacting RPA application workflow performance, said overriding the bot control property value with the updated bot control property value without impacting RPA application workflow performance for correcting the RPA application workflow failure; and
  following completion of the RPA application workflow runtime, posting to the distributed ledger a second block storing a second encrypted key value pair, the second encrypted key value pair comprising the application control property value and the updated bot control property value.

2. The method of claim 1, wherein the scanning is triggered by initiation of the RPA application workflow and runs continuously until the workflow is complete.

3. The method of claim 1, wherein the application parameter value comprises application metadata.

4. The method of claim 1, wherein the scanning is a second scan, and a first scan comprises:
  extracting one or more application parameters from an application centralized object repository;
  extracting one or more bot parameters from the bot configuration file; and
  generating the first encrypted key value pair based on one of the extracted application parameters and one of the extracted bot parameters.

5. The method of claim 4, further comprising using one or more Python scripts to extract application parameters, extract bot parameters, generate first and second blocks, and override bot configuration files.

6. The method of claim 1, further comprising:
  validating the second block; and
  in response to validation of the second block, clearing a temporary cache.

7. One or more non-transitory computer-readable media storing computer-executable instructions which, when executed by a processor on a computer system, perform a method for dynamic modification of RPA control parameters using blockchain structure, said method for correcting RPA application workflow failure, the method comprising:
  in response to initiation of an RPA application workflow, initiating a background application, the background application running concurrent with the RPA application workflow without causing a decrease in RPA application workflow speed;
  at the background application:
    at a first parallel processing thread:
      continuously scanning RPA application metadata for a duration of RPA application workflow runtime; and
      extracting an application parameter comprising an application control property value; and
    at a second parallel processing thread:
      continuously scanning a bot configuration file for the duration of the RPA application workflow runtime; and
      extracting a bot control property value, the bot control property value corresponding to the application control property value;
    autogenerating a key value pair comprising the extracted application control property value and the extracted bot control property value;
    accessing a distributed ledger and validating a hash of the key value pair against a first encrypted key value pair stored as a first block in the distributed ledger; and
    in response to a failure to validate the hashed key value pair against the first block:
      autogenerating an override script for the bot control property value in the bot configuration file, the override script modifying the bot configuration file with an updated bot control property value based on the extracted application control property value;
      overriding the bot control property value with the updated bot control property value for the duration of the RPA Application workflow runtime without impacting RPA application workflow performance, said overriding the bot control property value with the updated bot control property value without impacting RPA application workflow performance for correcting the RPA application workflow failure;
  and
    following completion of the RPA Application workflow runtime, posting to the distributed ledger a second block storing a second encrypted key value pair, the second encrypted key value pair comprising the application control property value and the updated bot control property value.

8. The media of claim 7, wherein the scanning is triggered by initiation of the RPA application workflow and runs continuously until the workflow is complete.

9. The media of claim 7, wherein the application parameter value comprises application metadata.

10. The media of claim 7, further comprising, in response to a failure to validate the hashed application parameter value and bot parameter value against the first block, flagging the first block.

11. The media of claim 7, wherein the scanning is a second scan, and a first scan comprises:
  extracting one or more application parameters from an application centralized object repository;
  extracting one or more bot parameters from the bot configuration file; and
  generating the first encrypted key value pair based on one of the extracted application parameters and one of the extracted bot parameters.

12. The media of claim 11, further comprising using one or more Python scripts to extract application parameters, extract bot parameters, generate first and second blocks, and override bot configuration files.

13. The media of claim 7, further comprising:
    validating the second block; and
    in response to validation of the second block, clearing a temporary cache.

* * * * *